Nov. 20, 1951      E. L. WIEDMAN      2,575,573
STEP FOR TRAILERS AND OTHER VEHICLES
Filed May 13, 1946      2 SHEETS—SHEET 1
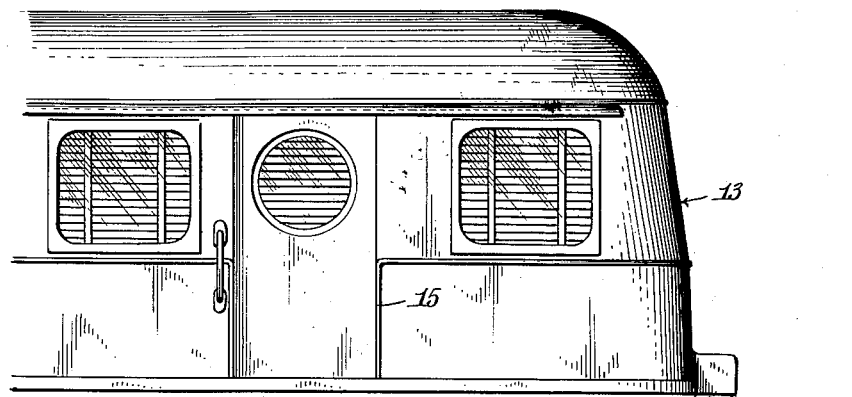
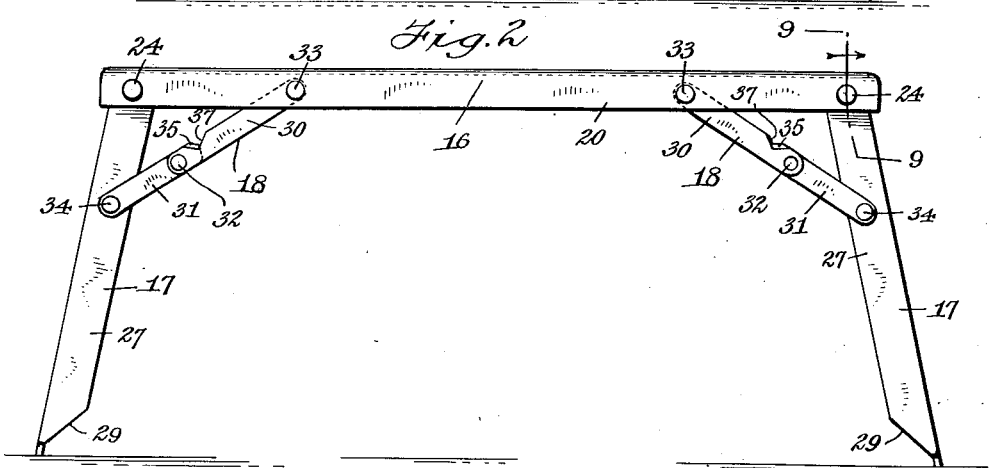
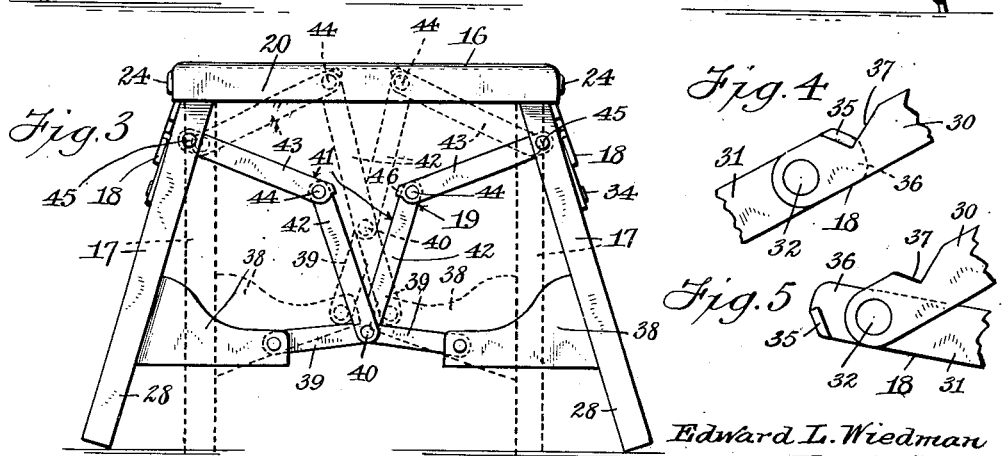
Edward L. Wiedman
Inventor,
By [signature]
Attorney.

Nov. 20, 1951 — E. L. WIEDMAN — 2,575,573
STEP FOR TRAILERS AND OTHER VEHICLES
Filed May 13, 1946 — 2 SHEETS—SHEET 2
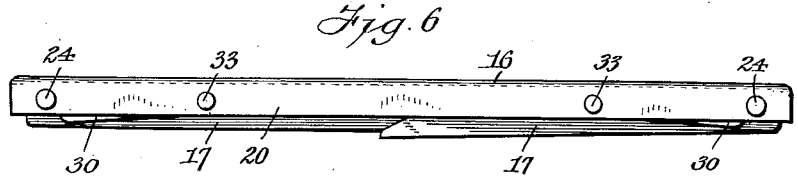
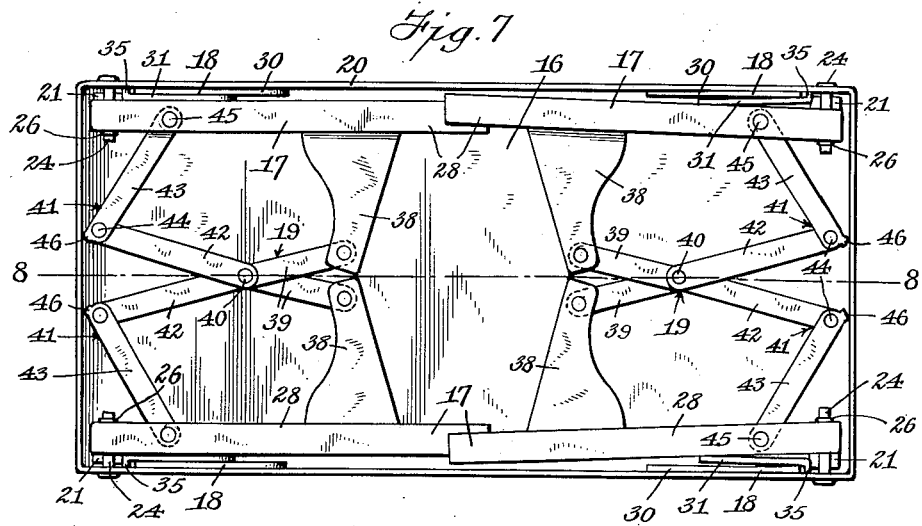
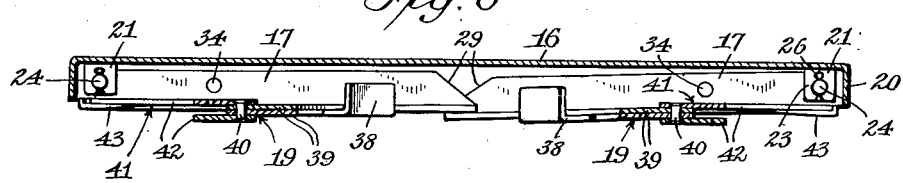
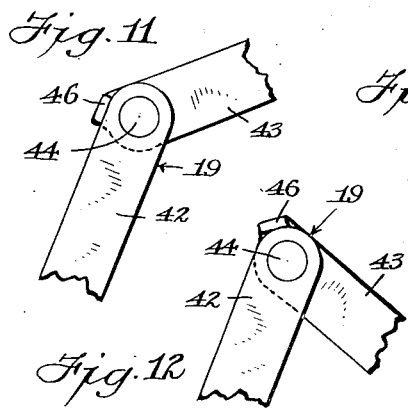
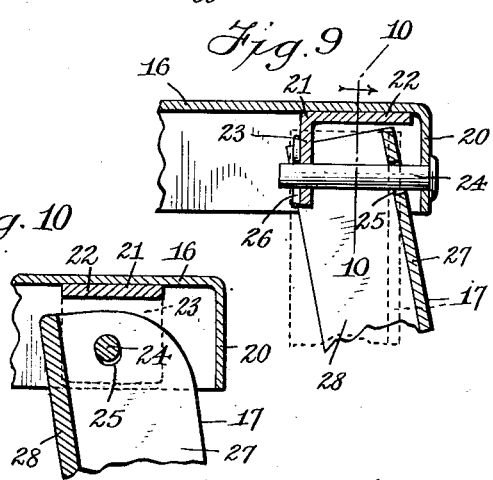

Patented Nov. 20, 1951

2,575,573

UNITED STATES PATENT OFFICE 2,575,573

STEP FOR TRAILERS AND OTHER VEHICLES

Edward L. Wiedman, Tonawanda, N. Y.

Application May 13, 1946, Serial No. 669,342

2 Claims. (Cl. 155—169)

My invention relates to a step for use with automobile trailers when parked.

Automobile trailers, because of the height of the floor from the ground on which they are parked, necessitate the use of a step in order to conveniently enter or leave the same, and it is one of the objects of my invention to provide a safe step for the purpose mentioned which can be easily folded and stored in a small space when the trailer is in transit.

Another object of my invention is to provide a step in which the supporting legs will be spread, both transversely and longitudinally, to assure a rigid support for the step capable of supporting considerable weight and to guard against wabbling.

A further object of my invention is to provide a simple, convenient and inexpensive step having a broad-faced and comparatively long top or tread member provided with a continuous-depending flange around its perimeter, and supporting legs so pivotally secured thereto that they may be spread both transversely and longitudinally so that their lower ends contact the ground in vertical planes outside of said top or tread member and so that when folding the legs they will assume positions wholly within the area of said top or tread member and be capable of lying between the longitudinally-disposed depending flange portions thereof.

With the above and other objects in view to appear hereinafter my invention consists in the novel features of construction and in the arrangement and combination of parts to be hereinafter described and more particularly pointed out in the subjoined claims.

In the drawings—

Fig. 1 is a side elevation of a portion of a trailer having its front end propped up to space the body of the trailer on an even keel above the ground, and showing my improved step in front of the entrance to the trailer.

Fig. 2 is a side elevation of my improved step.

Fig. 3 is an end elevation of the same.

Fig. 4 is a view of the jointed ends of one of the folding braces which hold the supporting legs of the step outward longitudinally of the step, the two links or members of the brace being shown alined and in bracing positions.

Fig. 5 is a similar view showing the two links or members of the toggle brace partly folded.

Fig. 6 is a side elevation of the step, showing the same folded.

Fig. 7 is an inverted view of the step folded.

Fig. 8 is a longitudinal section of the folded step, tread side up, taken on line 8—8, Fig. 7.

Fig. 9 is an enlarged section taken on line 9—9, Fig. 2, looking in the direction of the arrow crossing said line.

Fig. 10 is a section taken on line 10—10, Fig. 9.

Fig. 11 is a view of the two links or members of the toggle spreader, showing the same in locked and spreading positions.

Fig. 12 is a similar view showing the two links or members in partly folded positions.

In Fig. 1 of the drawings, this step is shown in a manner in which it is used in association with a parked trailer, designated by the numeral 13. The forward ends of trailers are invariably provided with means for attaching them to an automobile and the rear half of the trailer body equipped with traction wheels. When attached to an automobile, the forward end of the trailer is held in elevated position so that the trailer is maintained in substantially horizontal position and drawn along with its traction wheels serving as its traveling support. When parking a trailer, the front end thereof is given support by one or more jacks, such as shown at 14, the jacks used for this purpose being adjustable so that the floor of the trailer will be in horizontal position. Thus arranged the floor of the trailer is invariably more than a step in height from the ground and in order to conveniently enter the trailer or depart from the same through the usual door opening 15 provided therefor, a block of wood or any other object capable of serving as a step is utilized.

My improved step comprises a top or tread member 16, which may hereinafter also be referred to as the body portion of the step, supporting legs 17, braces 18 and spreader devices 19. The top or tread member 16 is preferably stamped of an oblong sheet of metal formed with a depending flange 20 around its perimeter so as to form an inverted tray-like structure having greater length than width for the purpose of providing a step approximating or exceeding in length the width of the door opening 15 and in width approximating a convenient stairway step. The step so dimensioned can be set in close proximity to the trailer body to provide a comfortable means of entry or egress from the body approaching in convenience a step built rigidly on the body so as to project therefrom, but such step, because of the width of the trailer, would strike obstructions along the road and in a short time be destroyed or at least damaged sufficiently to render it useless for the purpose intended.

In a step in which the supporting legs are foldable into the tray-like tread member or body portion, the step can be quickly collapsed and placed in the trailer body without inconvenience to the occupants, since it occupies but little space.

At each of the four corners of the tray-like tread member or body portion, one of the supporting legs 17 is pivotally connected so that it may swing in directions at right angles to each other. For this purpose an angle bracket 21 is provided which has one arm 22 spot welded or otherwise fastened to the under side of the tray-like tread member and its other arm 23 depending therefrom and arranged in spaced relation to and parallel with the longitudinal portion of the depending flange 20 at the same side of the tread member. A pivot pin 24 is passed through said flange portion and the depending arm 23 and it is also passed through an elongated pivot hole 25 formed in the leg near its upper end, the pivot pin 24 being passed through said elongated pivot hole 25 before it is passed through the depending arm 23 of the bracket 21, and in order to retain the pivot pin in place a cotter-pin 26 is passed through the end of the pin projecting beyond the depending arm 23 of the bracket. This construction permits the supporting leg to be swung on the pivot pin and also enables it to be swung at a right angle to such movement. Thus the lower ends of the supporting legs at the four corners of the tread member or body portion may be extended or spread in two directions so that they flare both outwardly beyond the planes in which the end portions of the depending flange 20 are arranged and also beyond the planes in which the longitudinal portions of the depending flange 20 are arranged.

It is, of course, to be understood that the brackets 21 at the four corners of the tread member or body portion may be fastened to the latter in any approved manner other than that described for the same; also that the pivot pins may be held in place, after the supporting legs are applied thereto, by welding the same to the depending arms of the brackets 21, or in any other suitable manner.

From the foregoing it will be apparent that the lower ends of the supporting legs are in contact with the ground or other surface on which the trailer rests at the four corners of an oblong area considerably greater than the area of the tread member or body portion 16 and when thus positioned, which I prefer to designate the spreading of the legs by reason of the latter being directed downwardly and outwardly both longitudinally and transversely, collapsing of the step is practically impossible under any weight which it is intended to support and movement of the tread member or body portion of the step, either laterally or longitudinally, with respect to the ground contacting ends of the supporting legs is impossible. A very safe, convenient and comfortable step is thus provided necessitating no timid approach on the part of the occupants or others entering or departing from the trailer.

The supporting legs are of angular formation in cross section, providing flanges 27, 28 disposed at right angles to each other and the pivot hole 25 formed in each of the supporting legs through which the pivot pins 24 are passed is punched through one of these flanges. The lower end of the last-mentioned flange is cut away at an angle, as at 29, so that when the ends of the legs come in contact with the ground or other surface, they can more readily indent or somewhat penetrate the same and assure a fixed position for the step.

Each of the braces 18 comprises two flat links or arms 30, 31 pivotally connected together, as at 32, so that they may be brought into alinement and serve as a rigid brace or be folded one adjacent the other. The outer ends of these links or arms are pivotally connected to the supporting legs, as at 34, and to the longitudinal portions of the depending flange 20 at the same side of the tread member or body portion to which the supporting arm is pivotally connected, as at 33, as clearly shown in Figs. 4 and 5. The pivotally connected inner end of one of said links or arms extends a distance beyond its pivot, as shown at 36, and at its extremity has an angular stop lug 35. The other link or arm of the brace has a V-shaped notch 37 extending inwardly from one edge which, when the links or arms 30, 31 are brought into alinement, as shown in Figs. 2 and 4, the stop lug enters said notch and comes in contact with one of the walls thereof, serving to retain said links or arms in rigid bracing condition with the supporting legs spread outwardly. The tendency, under weight applied to the step, is to cause folding of the braces by downward movement of the pivoted medial portions thereof, which is prevented by the use of the V-shaped notch 37 and stop lug 35. The braces 18 are, therefore, as effective as a one-piece brace, which latter, if used and pivotally connected at its ends in the manner of the braces shown and described, would prevent folding of the step.

I wish here to stress that under the appended claims I do not wish to limit myself to the type of braces shown and described, but include under the terms of certain of the claims, any brace which will permit spreading of the legs beyond the vertical in longitudinal and lateral directions and folding of the same into the inverted tray-like tread member or body portion. It will be apparent from the description of the means provided for pivotally connecting the upper ends of the supporting legs to the tread member or body portion that the spreading of the legs in the longitudinal direction is effected by swinging movement of the legs on centers which are the axes of the pivot pins 24 and that such movements could be effected by having the pivot holes 25 in the legs conform in size to the diameter of said pivot pins. So formed, however, lateral spreading of the supporting legs could not take place and for this reason I have elongated the pivot holes to allow tilting of the supporting legs on the pivot pins in the direction of the length of said pins, as clearly shown in Fig. 9.

It is to be understood that the supporting legs, when in truly vertical position, have all portions thereof within an area equaling that of the interior area of the tray-like tread member or body portion and that, therefore, the supporting legs may be swung or folded upwardly and assume positions within said tray-like member or body portion, as clearly shown in Figs. 6 to 8 of the drawings. When so folded, the braces 18 are folded so that the two links or members thereof lie side by side adjacent the longitudinal portions of the depending flange 20 and the legs at the same side of the step are arranged that the free lower ends thereof are overlapped and almost completely lie within the tray-like tread member or body portion.

When these legs are swung out of the tray-like tread member or body portion, the braces 18, when straight lined or extended, as shown in Fig. 2, will cause the supporting legs to be spread longitudinally, or in other words, cause said legs to assume downwardly and outwardly inclined positions in which they are disposed at an obtuse angle to the tread member or body portion. Thus positioned, they are not laterally spread or inclined and this is effected by the spreading devices 19 hereinbefore referred to in a general way.

To accomplish the lateral spreading of the legs beyond the vertical, the legs at each end of the step are articulately connected together or paired and each leg of each pair of legs has an inwardly extending arm 38 rigidly connected thereto by spot welding or otherwise. To the inner end of said arms connector links 39 are pivotally connected and they extend therefrom toward the tread member or body portion 16, except when the supporting legs are spread laterally. Both of said links 39 have common pivotal connection at their inner ends, as at 40, with corresponding ends of toggle devices 41 disposed at opposite sides of the longitudinal center of the step, each of which consists of two arms or members 42, 43 pivotally connected together, as at 44, the outer or lower ends of the arms or members 42 being pivotally connected to said common pivotal connection 40 of the connector links 39 to effect the stated common connection of the toggle devices with said links, while the outer ends of the arms or members 43 are pivotally connected to the flanges 28 of the supporting legs, as at 45.

When the step is unfolded in the manner shown in Fig. 3, the several parts of the spreader device 19, such as the arms 38 and links 39 as well as the arms 42 and 43, may be used as racks or supports for holding a broom, a shovel or the like lengthwise underneath the tread member so that such implements bridge the spreader devices at opposite ends of the step and will be easily accessible for keeping the tread member free of dirt or snow, or such parts may support wash or dust cloths to keep the step clean so that it can be used as a seat. Such implements or equipment, so placed, would be out of the way until needed.

When the supporting legs of the step are folded into the tray-like tread member or body portion 16, as shown in Fig. 7, and when each pair of legs is swung downwardly and spread longitudinally, as shown in Fig. 2, and by dotted lines in Fig. 3, the various parts of the spreading devices appear in the positions shown in Fig. 7 and in dotted lines in Fig. 3, the rigid arms 38 being opposed end to end in closely spaced relation. With the parts thus arranged, the legs of each pair may be spread laterally, it being simply necessary to take hold of the lower ends of the legs and force them apart, or force the acutely-angled arms or members 43 of each toggle device downwardly from the position shown in full lines in Fig. 7 and in dotted lines in Fig. 3 to the position shown in full lines in Fig. 3, whereupon the connector links 39 are caused to assume a position approaching the horizontal, while the arms or members of the toggle devices assume positions at obtuse angles to each other, in which positions they are maintained by stop lugs 46 extending from the ends of the arms or members 43 and bearing against the edges of the arms or members 42, as best shown in Figs. 3 and 11.

When folding the step it will be necessary to break the toggle devices by causing the arms or members thereof to swing from the positions shown in full lines to those shown in dotted lines in Fig. 3, which will bring the supporting legs in vertical position so that they can be swung inwardly and upwardly against the tread member or body portion upon breaking the braces 18, the members of each of which will fold upon themselves and assume positions between the longitudinal portions of the flange 17 of the tread member or body portion and the legs to which they are pivotally attached, which legs will then be at least partly positioned within the tray-like tread member or body portion, as clearly shown in Fig. 7.

The arms of the braces 18 are comparatively thin, yet when brought into alignment with the stop lugs 36 extending laterally from one arm and bearing against the edge of the other arm, rigid braces are provided. They, however, are sufficiently flexible so that when spreading the supporting legs laterally by means of the spreading devices 19 or otherwise, they will accommodate themselves to the changing relations of the pivots by means of which opposite ends thereof are secured to the step structure.

It may also be stated that by passing the pivot pins 24 through slightly elongated pivot holes 25 formed in the supporting legs, a connection is provided between the supporting legs and the tread member or body portion of the step which may be termed universal, in that movement of the supporting legs is permitted both laterally and longitudinally with respect to the tread member or body portion 16.

Having thus described my invention what I claim is:

1. A step for automobile trailers or the like to facilitate ingress to and egress from the latter, comprising a tread member having a peripheral flange extending around its perimeter, a bracket secured to the under side of said tread member at each corner of the latter and having a depending arm spaced from the flange thereof, a pivot pin passed transversely through said flange and the depending arm of each bracket, a supporting leg for each pivot pin having an elongated pivot hole through which said pivot pin is passed, said supporting legs being adapted to be swung on said pivot pins in the direction of the length thereof or at a right angle thereto, foldable braces connecting said supporting legs with said flange at the sides of said tread member so constructed and arranged to permit said legs to be swung upwardly on said pivot pins substantially parallel with said tread member or at an angle thereto to support the latter, arms projecting inwardly from said supporting legs with the arms of the supporting legs at each end of said tread member disposed in opposing relation, links pivotally connected together at their inner ends and having their outer ends pivotally connected to the inner ends of said arms, and a toggle device at each side of the longitudinal center of the step comprising two members pivotally connected together, each of said toggle devices having the outer ends of one of its members pivotally connected to the pivotally-connected inner ends of said links and the outer ends of its other member pivotally connected to one of each pair of supporting legs in a plane above said arms, said toggle devices serving to hold the supporting legs of each pair in laterally spread relation, and means embodied in the construction of said toggle devices to prevent undue spreading of said supporting legs.

2. A step for automobile trailers or the like, comprising an oblong flat tread member, a supporting leg at each of the four corners of said tread member adapted to be swung longitudinally and laterally with respect to said tread member, the supporting legs at each end of said tread member being arranged in pairs and having opposed rigid inwardly-extending arms, links having their outer ends pivotally connected with the rigid arms of each pair of said supporting legs, other arms having one of their ends pivotally connected to the inner ends of said links by a pivot common to all, said other arms extending upwardly from said links, and additional arms swingably connecting the upper ends of said other arms with said supporting legs near their upper ends, said arms and links serving to laterally spread the legs at each end of said tread member at an obtuse angle to the latter, and braces connecting said supporting legs with the sides of said tread member to maintain said supporting legs in pivotally adjusted relation with respect to the length of said tread member.

EDWARD L. WIEDMAN.

REFERENCES CITED

The following references are of record in the file of this patent:

UNITED STATES PATENTS

| Number | Name | Date |
| --- | --- | --- |
| 329,903 | Hogeland | Nov. 10, 1885 |
| 1,150,938 | Hensley | Aug. 24, 1915 |
| 1,178,597 | Owens | Apr. 11, 1916 |
| 1,294,264 | Herman | Feb. 11, 1919 |
| 1,398,471 | Smart | Nov. 29, 1921 |
| 1,426,422 | Stowe | Aug. 22, 1922 |
| 1,607,878 | Doettling | Nov. 23, 1926 |
| 1,677,339 | Hansen | July 17, 1928 |
| 2,396,737 | Maclasky | Mar. 19, 1946 |